(12) United States Patent
Tam et al.

(10) Patent No.: US 10,826,146 B2
(45) Date of Patent: Nov. 3, 2020

(54) NETWORKING SYSTEM COMPRISING A WAVEGUIDE THAT CONNECTS A TRANSMITTER TO A RECEIVER, WHERE THE WAVEGUIDE INCLUDES A GUIDING ARRAY HAVING A PERIODIC ARRAY OF CONDUCTIVE ELEMENTS

(71) Applicant: Marvell World Trade Ltd., St. Michael (BB)

(72) Inventors: Sai-Wang Tam, Sunnyvale, CA (US); Alden C. Wong, Sunnyvale, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

(21) Appl. No.: 16/258,731

(22) Filed: Jan. 28, 2019

(65) Prior Publication Data

US 2019/0253094 A1 Aug. 15, 2019

Related U.S. Application Data

(60) Provisional application No. 62/628,822, filed on Feb. 9, 2018.

(51) Int. Cl.
*H01P 1/04* (2006.01)
*H01P 11/00* (2006.01)
(Continued)

(52) U.S. Cl.
CPC .............. *H01P 1/042* (2013.01); *H01P 1/022* (2013.01); *H01P 3/16* (2013.01); *H01P 5/02* (2013.01);
(Continued)

(58) Field of Classification Search
CPC .. H01P 3/16; H01P 1/042; H01P 5/024; H01P 5/087; H01P 11/006; H01P 1/022
(Continued)

(56) References Cited

U.S. PATENT DOCUMENTS 2,849,692 A    8/1958   Fox
3,434,774 A *   3/1969   Miller ................ G02B 6/03638
                                                                                                 385/125

(Continued)

FOREIGN PATENT DOCUMENTS

| EP | 2395598 A1 | 12/2011 |
| EP | 3203287 A1 | 8/2017 |
| WO | 2016209375 A1 | 12/2016 |

OTHER PUBLICATIONS

International Application PCT/IB2019/052647 Search Report dated Jun. 28, 2019.

(Continued)

*Primary Examiner* — Benny T Lee (57) ABSTRACT

A networking system includes a transmitter, a waveguide and a receiver. The transmitter is configured to generate a millimeter-wave signal carrying data. The waveguide is transmissive at millimeter-wave frequencies and is configured to receive the millimeter-wave signal from the transmitter, and to guide the millimeter-wave signal from the transmitter to a downstream location by having a dielectric constant that varies over a transversal cross-section of the waveguide in accordance with a predefined profile. The receiver is configured to receive the millimeter-wave signal guided by the waveguide, and to extract the data carried by the received millimeter-wave signal.

19 Claims, 6 Drawing Sheets

(51) Int. Cl.
*H01P 1/02* (2006.01)
*H04B 3/52* (2006.01)
*H01P 3/16* (2006.01)
*H01P 5/02* (2006.01)
*H04B 1/00* (2006.01)
*H04B 1/3822* (2015.01)
*H04B 1/44* (2006.01)
*H01P 5/08* (2006.01)

(52) U.S. Cl.
CPC .......... *H01P 11/001* (2013.01); *H01P 11/006* (2013.01); *H04B 1/0007* (2013.01); *H04B 1/3822* (2013.01); *H04B 1/44* (2013.01); *H04B 3/52* (2013.01); *H01P 5/087* (2013.01)

(58) Field of Classification Search
USPC ............................... 333/239, 248, 254, 24 R
See application file for complete search history.

(56) References Cited

U.S. PATENT DOCUMENTS

| | | | |
|---|---|---|---|
| 3,703,690 A | | 11/1972 | Ravenscroft et al. |
| 4,463,329 A | * | 7/1984 | Suzuki ................. H01P 11/006 264/127 |
| 4,465,336 A | * | 8/1984 | Huber et al. ........... G02B 6/105 385/11 |
| 2013/0307645 A1 | | 11/2013 | Mita et al. |
| 2014/0285277 A1 | | 9/2014 | Herbsommer et al. |
| 2015/0295300 A1 | | 10/2015 | Herbsommer et al. |
| 2016/0036114 A1 | * | 2/2016 | Okada ................... H02J 7/025 307/104 |
| 2016/0164571 A1 | | 6/2016 | Bennett et al. |
| 2016/0240907 A1 | * | 8/2016 | Haroun ................. G01S 13/931 |
| 2017/0018831 A1 | | 1/2017 | Henry et al. |
| 2017/0059356 A1 | | 3/2017 | Kallman et al. |
| 2018/0040936 A1 | | 2/2018 | Yoshimoto et al. |

OTHER PUBLICATIONS

Yeh et al., "The Essence of Dielectric Waveguides", Springer, Chapter 5, relevant pp. 155-160, Jun. 17, 2008.
International Application PCT/IB2019/050667 Search Report dated Jun. 6, 2019.
Bruno et al., "Flexible Dielectric Waveguides with Powder Cores", IEEE Transactions on Microwave Theory and Techniques, vol. 36, No. 5, pp. 882-890, May 1988.
Rogers Corporation, "RO3000® Series Circuit Materials, RO3003™, RO3006™, RO3010™ and RO3035™ High Frequency Laminates", Datasheet, pp. 1-4, year 2018.
IEEE 802.3bw-2015—IEEE Standard for Ethernet Amendment 1: "Physical Layer Specifications and Management Parameters for 100 Mb/s Operation over a Single Balanced Twisted Pair Cable (100BASE-T1)", pp. 1-88, Oct. 2015.
DuPont™ Teflon, Fluoropolymer foam Resin FFR 880, 2 pages, year 2012.
Ahirwar et al., U.S. Appl. No. 16/370,999, filed Mar. 31, 2019.
Tam et al., U.S. Appl. No. 16/299,154, filed Mar. 12, 2019.
U.S. Appl. No. 16/370,999 office action dated Jun. 25, 2020.
U.S. Appl. No. 16/299,154 office action dated Apr. 2, 2020.

* cited by examiner

NETWORKING SYSTEM COMPRISING A WAVEGUIDE THAT CONNECTS A TRANSMITTER TO A RECEIVER, WHERE THE WAVEGUIDE INCLUDES A GUIDING ARRAY HAVING A PERIODIC ARRAY OF CONDUCTIVE ELEMENTS

CROSS-REFERENCE TO RELATED APPLICATIONS

This application claims the benefit of U.S. Provisional Patent Application 62/628,822, filed Feb. 9, 2018, whose disclosure is incorporated herein by reference.

FIELD OF THE DISCLOSURE

The present disclosure relates generally to waveguide interconnects, and particularly to millimeter-wave waveguides and associated devices.

BACKGROUND

Various types of communication media have been proposed for in-car communication systems. For example, Ethernet communication over twisted-pair copper wire media is specified in "IEEE 802.3bw-2015-IEEE Standard for Ethernet Amendment 1: Physical Layer Specifications and Management Parameters for 100 Mb/s Operation over a Single Balanced Twisted Pair Cable (100BASE-T1)," March, 2015.

The description above is presented as a general overview of related art in this field and should not be construed as an admission that any of the information it contains constitutes prior art against the present patent application.

SUMMARY OF THE INVENTION

An embodiment that is described herein provides a networking system including a transmitter, a waveguide and a receiver. The transmitter is configured to generate a millimeter-wave signal carrying data. The waveguide is transmissive at millimeter-wave frequencies and is configured to receive the millimeter-wave signal from the transmitter, and to guide the millimeter-wave signal from the transmitter to a downstream location by having a dielectric constant that varies over a transversal cross-section of the waveguide in accordance with a predefined profile. The receiver is configured to receive the millimeter-wave signal guided by the waveguide, and to extract the data carried by the received millimeter-wave signal.

In some embodiments, the predefined profile of the dielectric constant is concave over the cross-section of the waveguide. In other embodiments, the predefined profile of the dielectric constant is convex over the cross-section of the waveguide. In yet other embodiment, the predefined profile of the dielectric constant is staircase shaped over the cross-section of the waveguide. In example embodiments, the transversal cross-section of the waveguide is one of hollow and solid. In disclosed embodiment, the transversal cross-section of the waveguide is one of rectangular, square, circular and elliptical.

In some embodiments, the networking system further includes a guiding adapter inserted between sections of the waveguide. The adapter includes an adapter body, and a guiding array including electrically-conductive elements that are disposed at periodic intervals along the adapter body for guiding the millimeter-wave signal along the adapter body. In an embodiment, the adapter body has a bent angular shape, and the guiding array of electrically-conductive elements is disposed along a longitudinal axis of the adapter body that follows the bent angular shape of the adapter body, the guiding array thereby being configured to guide the millimeter-wave signal to follow the bent angular shape of the adapter body.

In some embodiments, the networking system further includes an in-line connector assembly disposed between a first section and a second section of the waveguide. The in-line connector assembly includes a first connector body coupled to the first section, a second connector body coupled to the second section, and a mechanical attachment mechanism. The first connector body has a first longitudinal axis and includes a first sub-array of electrically-conductive elements disposed at periodic intervals along the first longitudinal axis. The second connector body has a second longitudinal axis and includes a second sub-array of electrically-conductive elements disposed at periodic intervals along the second longitudinal axis. The mechanical attachment mechanism is configured to hold the first connector body and the second connector body in proximity to one another.

In an embodiment, the mechanical attachment mechanism is configured to align the first longitudinal axis and the second longitudinal axis, to thereby jointly form from the first sub-array and the second sub-array a non-interrupted array of the electrically-conductive elements that guides the millimeter-wave signal to propagate from the first section through the second section of the waveguide. Typically, when held in proximity to one another by the mechanical attachment mechanism, the first connector body and the second connector body form the non-interrupted array of the electrically-conductive elements irrespective of whether physical contact is made between the first connector body and the second connector body.

In a disclosed embodiment, the mechanical attachment mechanism includes one or more clips configured to hold the first connector body and the second connector body in fixed orientation or in physical contact with each other. In another embodiment, the mechanical attachment mechanism includes one or more magnets configured to hold the first connector body and the second connector body in a fixed orientation or in physical contact with each other.

In some embodiments, the transmitter includes a plurality of selectively switchable current sources that are configured to modulate an envelope of the millimeter-wave signal responsively to the data. In some embodiments, the receiver is configured to down-convert the received millimeter-wave signal so as to produce an Intermediate Frequency (IF) signal, and to extract the data by detecting an envelope of the IF signal. In some embodiments, the transmitter is configured to pre-distort the millimeter-wave signal prior to transmission, and the transmitter and the receiver are configured to jointly carry out a two-stage calibration process that calibrates pre-distortion of the millimeter-wave signal to compensate for both static and dynamic non-linearity effects.

There is additionally provided, in accordance with an embodiment that is described herein, a waveguide including an elongated body that is transmissive at millimeter-wave frequencies. The waveguide is configured to receive a millimeter-wave signal, and to guide the millimeter-wave signal by having a dielectric constant that varies over a transversal cross-section of the elongated body in accordance with a predefined dielectric profile.

There is also provided, in accordance with an embodiment that is described herein, a method for communication in a networking system. The method includes generating a millimeter-wave signal carrying data in a transmitter. The millimeter-wave signal is guided from the transmitter to a downstream location by a waveguide, which is transmissive at millimeter-wave frequencies and has a dielectric constant that varies over a transversal cross-section of the waveguide in accordance with a predefined profile. The millimeter-wave signal guided by the waveguide is received in a receiver, and the data carried by the received millimeter-wave signal is extracted.

There is further provided, in accordance with an embodiment that is described herein, a guiding adapter for a millimeter-wave waveguide. The guiding adapter includes an adapter body and a guiding array. The adapter body is configured to be inserted between first and second sections of the millimeter-wave waveguide. The guiding array includes electrically-conductive elements that are disposed at periodic intervals along an axis of the adapter body. The guiding array is configured to guide a millimeter-wave signal between the first and second sections along the adapter body.

In disclosed embodiments, the adapter body is formed with an angular bend, and the guiding array of electrically conductive elements is disposed along a longitudinal axis of the adapter body corresponding to the angular bend. The guiding array is configured to guide the millimeter-wave signal to follow the angular bend. In some embodiments, the adapter body includes two or more stacked dielectric layers, and the guiding array of electrically conductive elements is formed in one or more electrically-conductive layers disposed between the stacked dielectric layers.

There is additionally provided, in accordance with an embodiment that is described herein, an in-line connector assembly for a millimeter-wave waveguide. The connector assembly includes a first connector body configured to be connected to a first section of the millimeter-wave waveguide, a second connector body configured to be connected to a second section of the millimeter-wave waveguide, and a mechanical attachment mechanism. The first connector body includes a first sub-array of electrically-conductive elements disposed at periodic intervals along the first connector body. The second connector body includes a second sub-array of electrically-conductive elements disposed at periodic intervals along the first connector body. The mechanical attachment mechanism is configured to proximally hold the first connector body and the second connector body in mutual proximity to one another, thereby forming a non-interrupted array of the electrically-conductive elements from the first sub-array and the second sub-array, the proximally held first and second sections being configured to guide a millimeter-wave signal propagating between the first section and the second section of the waveguide.

In some embodiments, the first connector body and the second connector body each includes two or more stacked dielectric layers, and the first sub-array and the second sub-array are formed in one or more electrically-conductive layers disposed between the stacked dielectric layers. In an embodiment, when proximally held in proximity to one another by the mechanical attachment mechanism, the first connector body and the second connector body are configured to form the guiding array of the electrically-conductive elements without making physical contact with one another.

There is further provided, in accordance with an embodiment that is described herein, an accessory for a millimeter-wave waveguide. The accessory includes a body and an array. The body is configured to be inserted in-line in the millimeter-wave waveguide, and includes two or more stacked dielectric layers. The array includes electrically-conductive elements that are disposed at periodic intervals in one or more electrically-conductive layers between the stacked dielectric layers of the body, for guiding a millimeter-wave signal along the accessory.

In some embodiments, the body is formed with an angular bend, and the array of electrically-conductive elements are disposed along a longitudinal axis of the body corresponding to the angular bend, the array thereby configured to guide the millimeter-wave signal to follow the angular bend. In some embodiments, the body terminates a first section of the waveguide, and the accessory further includes a mechanical attachment mechanism for connecting to a second accessory that terminates a second section of the waveguide.

In disclosed embodiments, the electrically-conductive elements are patterned on one or more of the dielectric layers in a Printed Circuit Board (PCB) fabrication process. In example embodiments, the electrically-conductive elements are patterned on the one or more of the dielectric layers by direct printing of an electrically-conductive material, or by deposition of an electrically-conductive layer and subsequent removal of selected parts of the electrically-conductive layer.

There is also provided, in accordance with an embodiment that is described herein, a method for a guiding a millimeter-wave signal. The method includes receiving the millimeter-wave signal from a first section of a millimeter-wave waveguide by an adapter including (i) an adapter body and (ii) a guiding array including electrically-conductive elements that are disposed at periodic intervals along an axis of the adapter body. The millimeter-wave signal is guided via the adapter body using the guiding array of electrically-conductive elements. The guided millimeter-wave signal is output to a second section of the millimeter-wave waveguide.

There is additionally provided, in accordance with an embodiment that is described herein, a method for fabricating a guiding adapter for a millimeter-wave waveguide. The method includes fabricating an adapter body configured to be inserted between first and second sections of the millimeter-wave waveguide. A guiding array, including electrically-conductive elements disposed at periodic intervals, is disposed along an axis of the adapter body, for guiding a millimeter-wave signal between the first and second sections along the adapter body.

In some embodiments, fabricating the adapter body includes stacking two or more dielectric layers, and fabricating the guiding array includes forming the electrically conductive elements in one or more electrically-conductive layers disposed between the stacked dielectric layers. In embodiments, forming the electrically conductive elements includes directly printing an electrically-conductive material on one or more of the dielectric layers, or depositing the electrically-conductive layer on one or more of the dielectric layers and subsequently removing selected parts of the electrically-conductive layer.

There is further provided, in accordance with an embodiment that is described herein, a method for connecting sections of a millimeter-wave waveguide. The method includes connecting a first section of the millimeter-wave waveguide to a first connector body including a first sub-array of electrically-conductive elements disposed at periodic intervals along the first connector body, and connecting a second section of the millimeter-wave waveguide to a second connector body including a second sub-array of electrically-conductive elements disposed at periodic intervals along the first connector body. The first connector body and the second connector body are attached to one another, thereby jointly forming from the first sub-array and the second sub-array a non-interrupted array of the electrically-conductive elements configured to guide the millimeter-wave signal propagating between the first section and the second section of the waveguide.

There is also provided, in accordance with an embodiment that is described herein, a method for fabricating an in-line connector assembly for a millimeter-wave waveguide. The method includes fabricating a first connector body configured to be coupled to a first section of the millimeter-wave waveguide, the first connector body including a first sub-array of electrically-conductive elements disposed at periodic intervals along the first connector body, and fabricating a second connector body configured to be connected to a second section of the millimeter-wave waveguide, the second connector body including a second sub-array of electrically-conductive elements disposed at periodic intervals along the first connector body. The first connector body and the second connector body are held in mutual proximity to one another by a mechanical attachment assembly, thereby jointly forming from the first sub-array and the second sub-array a non-interrupted array of the electrically-conductive elements configured to guide the millimeter-wave signal as it propagates between the first section and the second section of the waveguide.

In some embodiments, fabricating the first connector body and the second connector body includes stacking two or more dielectric layers, and forming the first sub-array and the second sub-array in one or more electrically-conductive layers disposed between the stacked dielectric layers. In example embodiments, forming the first sub-array and the second sub-array includes directly printing an electrically-conductive material on one or more of the dielectric layers, or depositing an electrically-conductive layer on one or more of the dielectric layers and subsequently removing selected parts of the electrically-conductive layer.

The present disclosure will be more fully understood from the following detailed description of the embodiments thereof, taken together with the drawings in which:

DETAILED DESCRIPTION OF EXAMPLE EMBODIMENTS

Embodiments that are described herein provide improved methods and apparatus for communication and networking. The disclosed techniques are useful, for example, in automotive, industrial and other environments that are characterized by severe noise, demanding Electro-Magnetic Compatibility (EMC) requirements and limited space, and at the same time require high data rates at high reliability and low cost.

In some embodiments, an automotive networking system comprises at least a transmitter and a receiver that communicate using millimeter-wave (mm-wave) signals. In the context of the present disclosure and in the claims, the term "millimeter-wave signal" refers to a signal whose wavelength is roughly in the range of 1 mm-10 mm. Nevertheless, the disclosed techniques are also suitably adaptable for application in other spectral bands.

In some embodiments, the transmitter and receiver communicate over a waveguide that is transmissive at mm-wave frequencies and has a varying dielectric constant. In the present context, the term "varying dielectric constant" means that the dielectric constant of the waveguide varies (i.e., is non-uniform) across a transversal cross-section of the waveguide in accordance with a predefined profile. In various embodiments, the waveguide is solid or hollow, and the variation in dielectric constant is continuous or graded, concave or convex, one-dimensional or two-dimensional, for example. Several examples of waveguide cross-sections, e.g., rectangular, stepped, circular or elliptical, and of dielectric-constant profiles that are non-uniform across such cross-section, are given below.

The disclosed mm-wave waveguides, having varying dielectric constant profiles, are highly effective in confining the electromagnetic energy of mm-wave signals along a path defined by the waveguide. As such, the waveguides described herein are characterized by low loss and good EMC performance. In some embodiments, the waveguide is made of plastic, having relatively low cost, low weight and small bending radius.

In some embodiments, the system further comprises a guiding adapter used for further reducing the achievable bending radius of the mm-wave waveguide. The guiding adapter is inserted in-line into (i.e., between adjacent sections of) the waveguide, e.g., at a point where installation requirements call for a sharp bend. In some embodiments, the guiding adapter comprises an adapter body having a bent angular shape, and an array of multiple electrically-conductive elements that are disposed at periodic intervals along the adapter body.

The array guides the mm-wave signal along the bent angular shape of the adapter body, and considerably improves electrical-field confinement and thus reduces signal loss as the mm-wave signal propagates around the bend. In an example embodiment, the adapter body is made of multiple dielectric layers of a Printed Circuit Board (PCB) material, and the array of electrically-conductive elements is fabricated in one or more electrically-conductive PCB layers disposed between the dielectric layers.

In some embodiments, a disclosed in-line connector assembly is used for connecting adjacent sections of a mm-wave waveguide. The connector assembly comprises two connector bodies, each connected to a respective section of the waveguide. Each connector body comprises a respective sub-array of electrically-conductive elements disposed at periodic intervals along the longitudinal axis of the connector body. When the connector bodies are attached to one another longitudinally, the two sub-arrays jointly form a non-interrupted array of electrically-conductive elements that confines and guides the mm-wave signal.

The connector assembly further comprises a mechanical attachment mechanism for attaching the connector bodies to one another. As will be shown below, the disclosed connector assemblies are highly tolerant to mechanical misalignment errors between the connector bodies, and still provide a high degree of electrical-field confinement and thus low loss. Moreover, this high performance is achieved without mandating solid mechanical contact between the connector bodies.

Additional embodiments that are described herein provide improved mm-wave transmitter and receiver circuitry, e.g., an envelope-modulation transmitter using a selectively-switched array of current sources, an Intermediate-Frequency (IF) envelope detection receiver, and a Digital Pre-Distortion (DPD) and equalization scheme.

Figure 1:
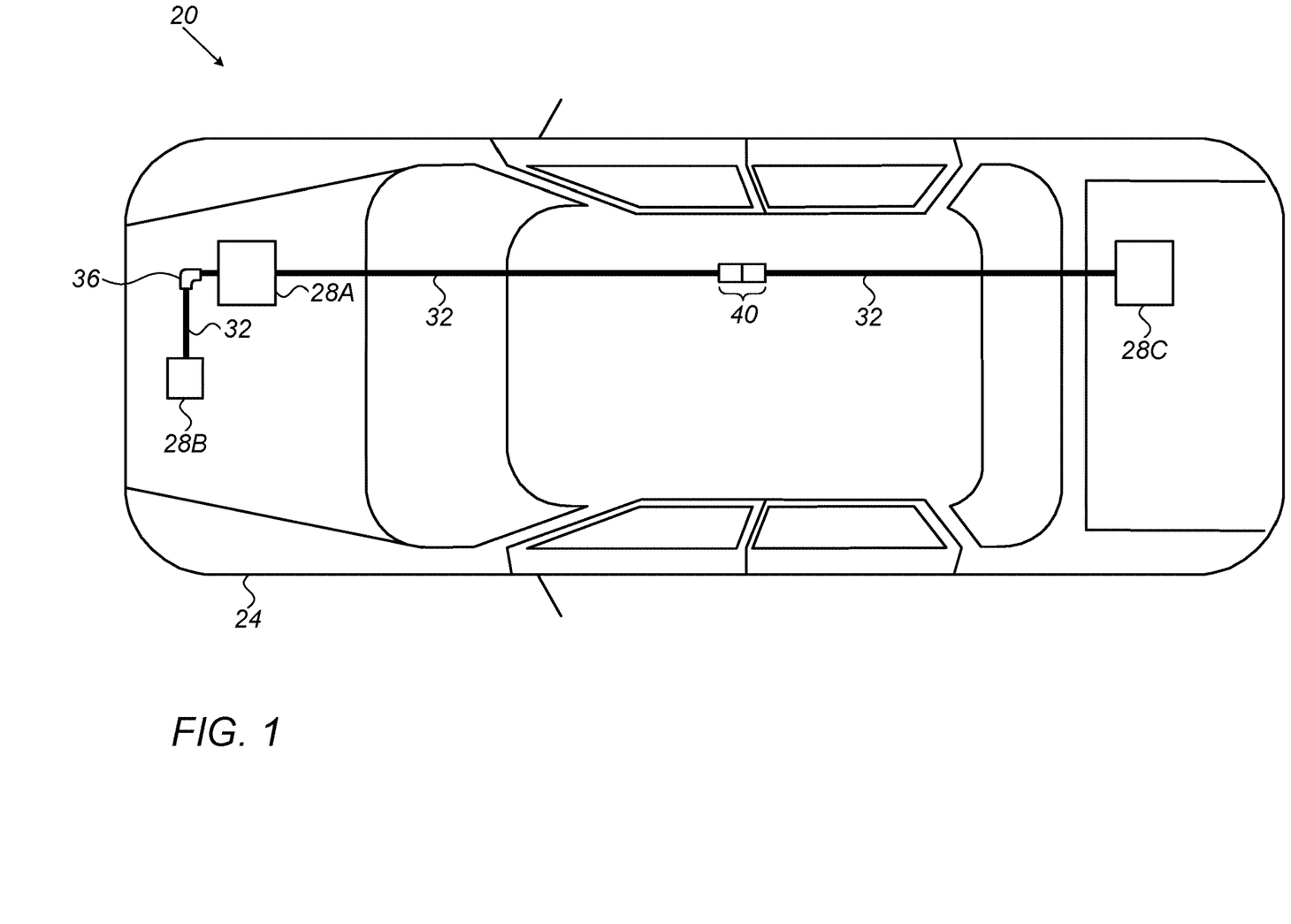
FIG. 1 is a block diagram that schematically illustrates a millimeter-wave automotive communication system, in accordance with an embodiment that is described herein.

FIG. 1 is a block diagram that schematically illustrates a millimeter-wave automotive communication system 20, in accordance with an embodiment that is described herein. In the present example, system 20 is used for in-car networking in a vehicle 24. System 20 comprises multiple communication units, in the present example three communication units (which may comprise, for instance a transmitter, switch and receiver) denoted 28A, 28B and 28C are seen. Communication units 28A, 28B and 28C are used for exchanging data between various elements of vehicle 24, e.g., between a central car computer and various cameras, environmental sensors, telematics components, and the like.

At least some of units 28A, 28B and 28C comprise one or more mm-wave transmitters, one or more mm-wave receivers, or one or more suitable network switching devices. Communication units 28A, 28B and 28C are linked by mm-wave waveguides 32. In some embodiments, a guiding adapter 36 is inserted in-line between sections of waveguide 32, to enable routing the waveguide over a bend that is sharper than can be accommodated merely by bending a second of waveguide 32. In some embodiments, a connector assembly 40 is used for connecting adjacent sections of waveguide 32. Several examples of mm-wave waveguides 32, guiding adapters 36 and connector assemblies 40 are described in detail below.

Figure 2:
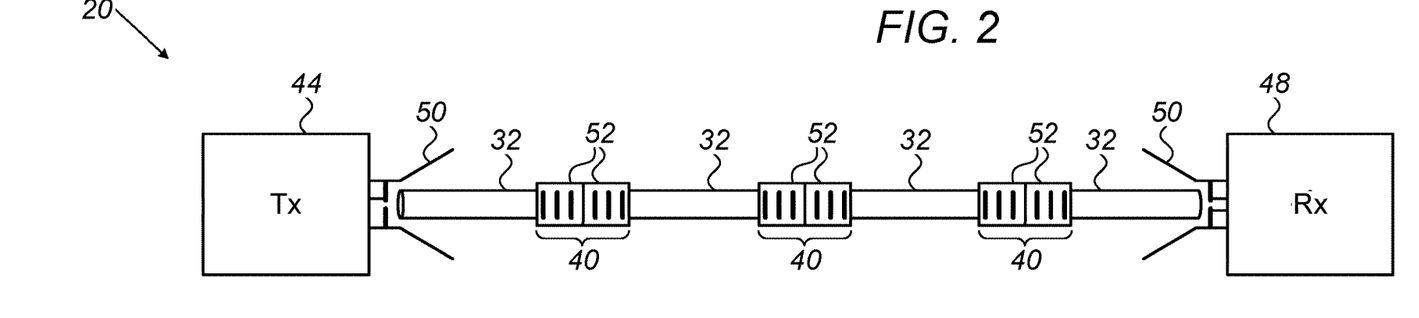
FIG. 2 is a schematic illustration of elements of the communication system of FIG. 1, in accordance with an embodiment that is described herein.

FIG. 2 is a schematic illustration of some elements of communication system 20, in accordance with an embodiment that is described herein. In the present example, a transmitter (Tx) 44 (comprised in one of communication units 28A, 28B and 28C) transmits a mm-wave signal, which carries data, to a receiver (Rx) 48 (comprised in another one of communication units 28A, 28B and 28C) over mm-wave waveguide 32.

In an embodiment, transmitter 44 comprises a waveguide coupler 50 for coupling the transmitted mm-wave signal to waveguide 32. Receiver 48 comprises a similar coupler 50 for extracting the mm-wave signal from waveguide 32. In the present example, couplers 50 comprise contact-less horn antennas that are positioned adjacent to, but do not necessarily touch, waveguide 32, to provide a suitable signal-bearing mm wave so that the waveguide 32 provides a physical interface to guides the wave as it propagates generally along a path defined by the waveguide. Alternatively, any other suitable coupler type can be used.

In some embodiments, mm-wave waveguide 32 is divided into two or more sections by one or more connector assemblies 40. Each connector assembly 40 comprises a pair of connectors 52. Such in-line connector assemblies are useful, for example, for achieving modular construction. In an example implementation, various parts of vehicle 24, for instance doors and chassis, are respectively constructed with their respective sections of waveguide 32. When the vehicle parts are assembled into a vehicle, the waveguide sections are connected to one another using connectors 52.

In the embodiment of FIG. 2, waveguide 32 is divided into four sections by three connector assemblies 40. In alternative embodiments, any other suitable number of waveguide sections can be cascaded using such connector assemblies. Examples structures of connector assemblies 40 are described in detail in FIGS. 7A, 7B, 8 and 9.

Figure 3:
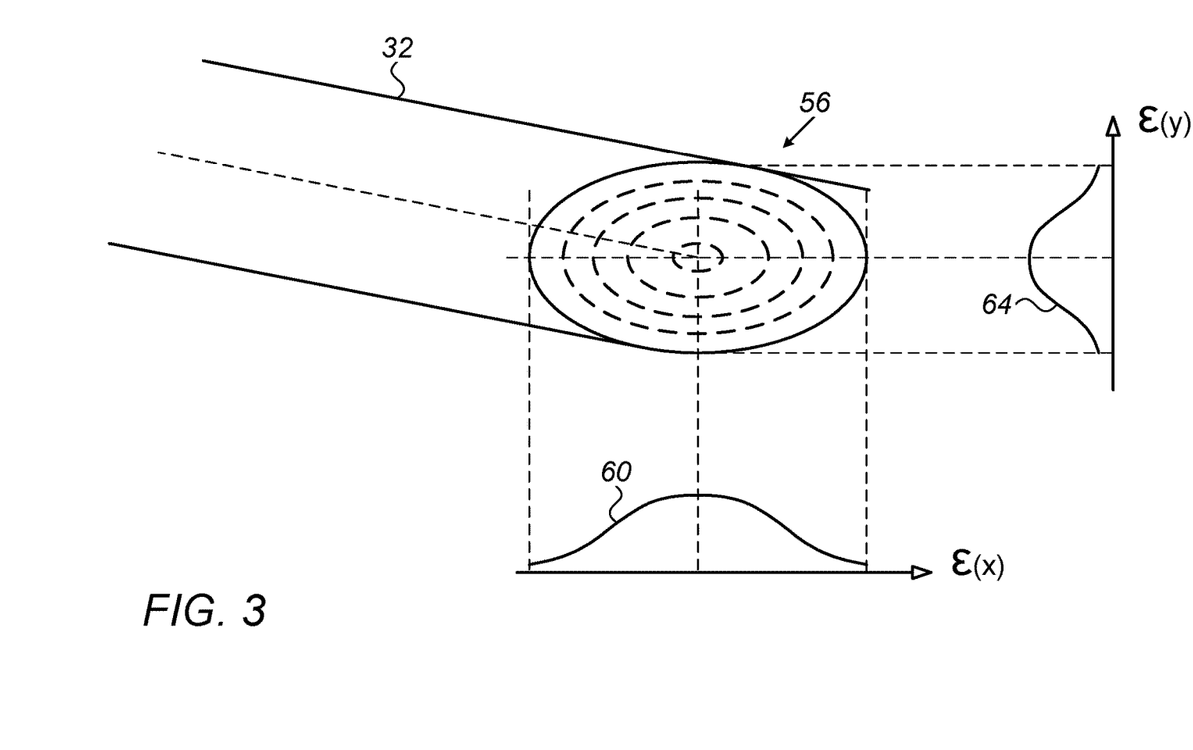
FIG. 3 is a diagram illustrating a millimeter-wave waveguide having a varying dielectric constant, in accordance with an embodiment that is described herein.

FIG. 3 is a diagram illustrating a transversal cross-section 56 of mm-wave waveguide 32, in accordance with an embodiment that is described herein. In the context of the present disclosure and in the claims, the term "transversal cross-section" means a cross section in a plane that is orthogonal to the longitudinal axis of the waveguide. In the example of FIG. 3, cross-section 56 is elliptical. In alternative embodiments, however, waveguide 32 may have any other suitable transversal cross-section, e.g., rectangular (e.g., square) or circular.

In the present example, waveguide 32 is made of plastic, which is transmissive at mm-wave frequencies. Various types of plastic can be used for constructing waveguide 32. In alternative embodiments, suitable non-plastic materials that are transmissive to mm-wave frequencies can be used. An example, non-limiting list of materials comprises Alumina, Polyethylene, Telfon (sintered or unsintered), Polystyrene, Fluorinated ethylene propylene (FEP) and Perfluoroalkoxy (PFA).

Graphs 60 and 64 illustrate the profile of the dielectric constant ε of waveguide 32 across transversal cross-section 56, in an embodiment. Graph 60 illustrates the dielectric constant as a function of position along the x-axis designated as ε(x). Graph 64 illustrates the dielectric constant as a function of position along the y-axis designated as ε(y). As seen, in this example the dielectric constant is maximal at the center of cross-section 56, and gradually decreases along both axes toward the perimeter of the cross-section.

In the present example, the dielectric-constant profile is convex along both axes. Alternatively, however, on each axis the profile of ε may have any other suitable shape.

Figure 4A:
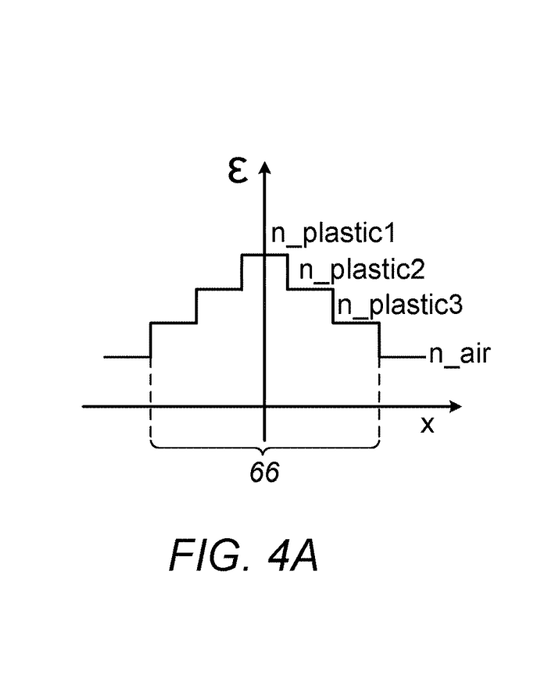
FIGS. 4A-4C are graphs showing examples of dielectric-constant profiles of millimeter-wave waveguides, in accordance with embodiments that are described herein.
Figure 4B:
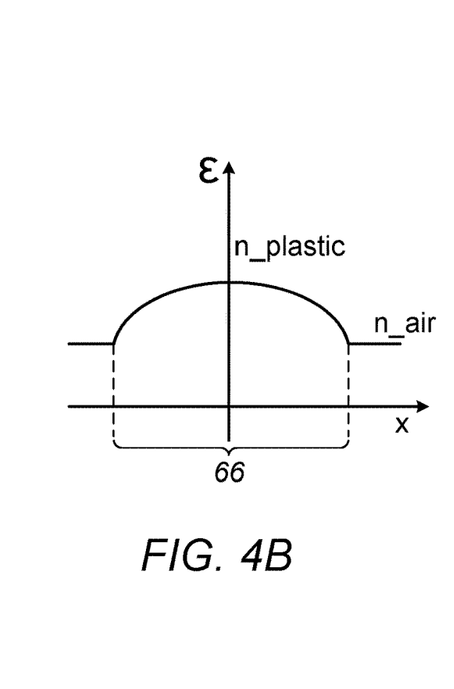
Figure 4C:
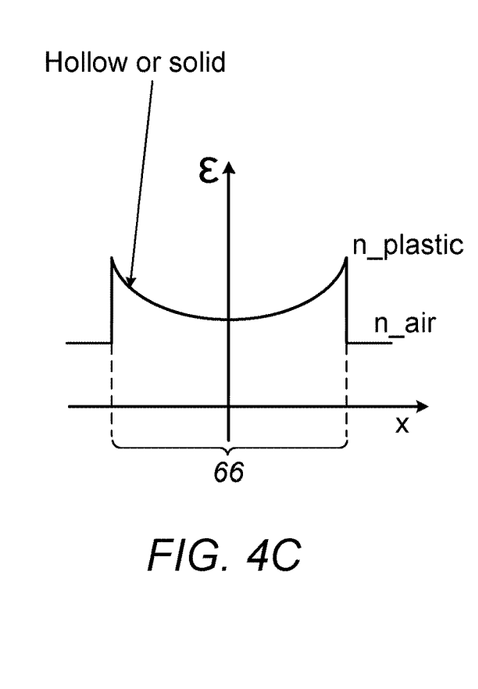

FIGS. 4A-4C are graphs showing examples of dielectric-constant profiles of millimeter-wave waveguides, in accordance with embodiments that are described herein. The graphs illustrate the profile of ε as a function of position along the x-axis, solely by way of example. An interval 66 marks the boundaries of cross-section 56. Thus, the profile outside interval 66 has ε=n_air, the dielectric constant of air. In this example, the width of the waveguide (i.e., the length of interval 66, over which the dielectric constant varies) is 2 mm, and the height of the waveguide is 1 mm. Alternatively, any other suitable values can be used.

In FIG. 4A, the dielectric-constant profile is staircase-shaped, i.e., divided into two or more discrete intervals, and constant within each interval. In the example of FIG. 4A the profile takes three values, the largest being n_plastic1 at the middle of the waveguide, transitioning to an intermediate value n_plastic2, and then to a lowest value n_plastic3 toward the perimeter of the waveguide. In alternative embodiments, any other suitable number of intervals and any other suitable values of ε can be used.

In FIG. 4B, the dielectric-constant profile is convex, having a maximal value n_plastic in the middle of the waveguide.

In FIG. 4C, the dielectric-constant profile is concave, having a minimal value in the middle of the waveguide, gradually increasing to a maximal value n_plastic at the perimeter.

The concave profile of FIG. 4C is roughly similar to the profile of a hollow waveguide, whose perimeter is made of plastic or other suitable material and whose interior is typically filled with air. Although the embodiments described herein refer mainly to solid waveguides (i.e., whose entire cross-section is made up of dielectric material), the disclosed techniques can be used with hollow waveguides, as well.

Generally, there is no dependence between the dielectric-constant profile along the two axes. For example, the dielectric-constant profile may be convex on both axes, concave on both axes, or convex on one axis and concave on the other axis. Further alternatively, the dielectric-constant profile may be constant on one axis and varying (e.g., convex, concave, staircase-shaped or otherwise) on the other axis.

Moreover, there is generally no dependence between the geometrical shape of the cross-section (e.g., rectangular, circular or elliptical) and the profile of the dielectric constant (e.g., convex, concave or staircase-shaped). In many practical cases, the geometrical shape of the cross-section is chosen for mechanical reasons (e.g., flexibility and installation requirements), whereas the profile of the dielectric constant is chosen for electro-magnetic performance reasons (e.g., electrical-field confinement or electro-magnetic wave propagation).

In comparison with mm-waveguides having a uniform (non-varying) dielectric constant, the disclosed waveguides have considerably better electrical-field confinement (and thus small power loss), particularly over sharp bends, e.g., with bending radius below 20 mm. A typical insertion loss of such a waveguide is on the order of <3 dB/m at 120 GHz. Moreover, the disclosed waveguides are simple to manufacture, e.g., by doping using diffusion. In an example electro-magnetic simulation performed by the inventors, a section of varying-dielectric-constant waveguide bent at a 10 mm radius had an insertion loss of 0.4 dB at 100 GHz. A comparable waveguide having a uniform dielectric constant exhibited a considerably higher loss of 4.3 dB.

In some embodiments, field-confinement and guiding of the mm-wave signal are further improved by using a periodic array of electrically-conducting elements. The description that follows explains this technique, and demonstrates its applicability to in-line guiding adapters and connector assemblies.

Figure 5:
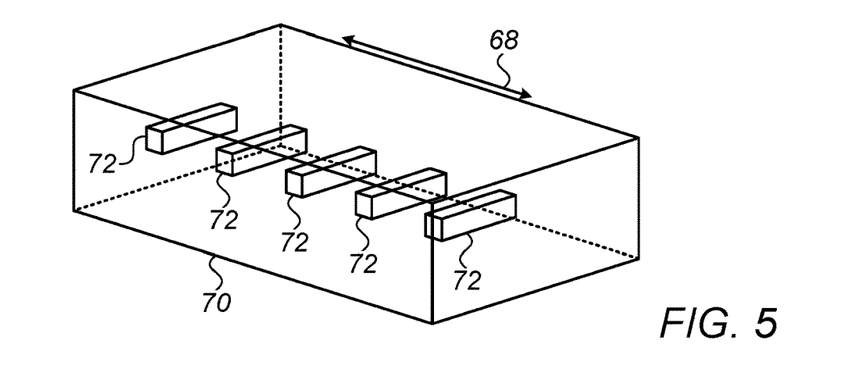
FIG. 5 is a three-dimensional view of a guiding array of electrically-conducting elements disposed in a dielectric body, in accordance with an embodiment that is described herein.

FIG. 5 is a three-dimensional view of a guiding array of electrically-conducting elements disposed in a dielectric body, in accordance with an embodiment that is described herein. As will be explained below, arrays of this sort are used, for example, in various accessories such as in-line guiding adapters and connector assemblies.

The figure shows an elongate body 70 (e.g., a body of a connector or of a guiding adapter) made of a high-K dielectric material. In the present context, a material having a dielectric constant larger than two (i.e., >2) is regarded a high-K material. One example of a high-K material is a ceramic-filled PTFE composite such as RO3003™, produced by Rogers Corp. (Chandler, Ariz.). Details of such material are given, for example, in a data sheet entitled "RO3000® Series Circuit Materials," 2018. Alternatively, any other suitable material can be used.

An arrow 68 marks the longitudinal axis of body 70, which is also the direction of propagation of the mm-wave along body 70. Multiple electrically-conducting elements 72 are disposed at periodic intervals in body 70 along axis 68. The array of electrically-conducting elements 72 guides the mm-wave signal to propagate along longitudinal axis 68. In the present example the array is straight. In alternative embodiments, as will be discussed with reference to FIG. 6 below, such arrays are highly effective in guiding mm-wave signals along bodies having bent angular shapes.

In the present example elements 72 comprise metallic bars. Alternatively, any other suitable shape can be used. The dimensions of the array (e.g., the length of electrically-conducting elements 72 and/or the spacing between adjacent elements 72 in the array) are typically chosen to match the frequency of the mm-wave signal. In the present example, the frequency of the mm-wave signal is 100 GHz, each element 72 is 1 mm long, 0.1 mm wide and 0.1 mm thick. (Without loss of generality, the element length and height are defined along axes perpendicular to axis 68, and the element width is defined along axis 68. The inter-element spacing (center to center) is 0.5 mm along axis 68. Alternatively, any other suitable frequency and dimensions can be used.

In some embodiments, the element length is one wavelength of the mm-wave signal, and the inter-element spacing is half a wavelength. Typically, such an array of electrically-conducting elements forms periodic constraints on the electrical field component of the mm-wave signal. In this manner, the array leads the mm-wave signal to propagate along the desired axis and confines the electrical field within the waveguide. As will be demonstrated below, this technique is useful for improving the propagation of mm-wave signals along sharp bends and across gaps, e.g., in connector assemblies.

Figure 6:
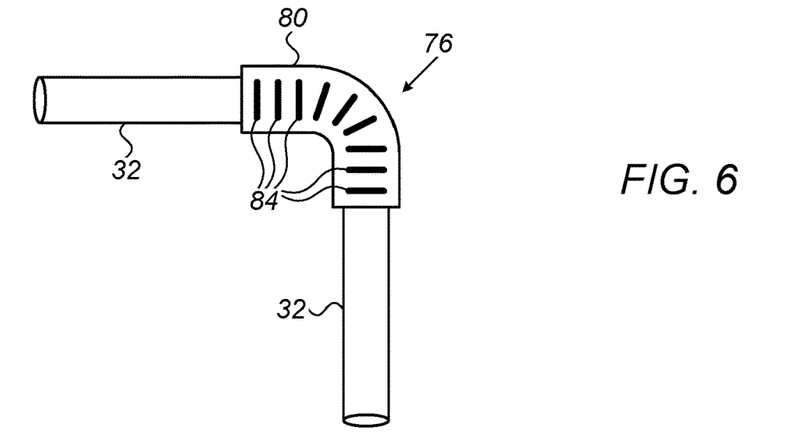
FIG. 6 is a diagram illustrating a guiding adapter comprising an array of electrically-conducting elements, in accordance with an embodiment that is described herein.

FIG. 6 is a diagram illustrating a guiding adapter 76, which is inserted in-line between two sections of waveguide 32 to guide the wave along a bent angular path, in accordance with an embodiment that is described herein. Adapter 76 has a bent angular shape, and it is used for guiding the mm-wave signal to propagate between the sections with small power loss.

Adapter 76 comprises a rigid adapter body 80, e.g., made of a high-K dielectric material. Each end of adapter body is coupled to a respective section of waveguide 32. A guiding array of electrically-conducting elements 84 is disposed in adapter body 80, at periodic intervals along the longitudinal axis of the adapter body. As noted above with reference to FIG. 5, any suitable shape and geometry can be used for the array. The array guides the mm-wave signal to propagate along the longitudinal axis of adapter body 80, along the bent angular shape.

Adapter 76 is useful, for example, when waveguide 32 needs to be bent with a small radius of curvature that would otherwise cause considerable attenuation to the mm-wave signal. In an example embodiment, the use of adapter 76 is preferred with bending radius below 10 mm. With higher radii of curvature, waveguide 32 can be simply bent into shape without excessive signal attenuation. In an example electromagnetic simulation performed by the inventors, the loss of adapter 76 with a bending radius of 5 mm was approximately 3 dB. Bending a section of waveguide 32 to the same radius or bend angle, without an adapter, caused a loss of approximately 13 bB.

In one example embodiment, adapter body 80 is made of RO3020® material, produced by Rogers Corp. The width, height and bend radius of the adapter body are 2 mm, 1 mm and 3 mm, respectively. The bend angle in this example is 90 degrees. The array of elements 84 in this example is made of copper or gold, and is positioned at the center of body 80. The length and width of each element 84 are 1 mm and 0.1 mm, respectively. Elements 84 are typically very thin, e.g., 2 microns. The inter-element spacing is approximately 0.5 mm. The above numerical values are given purely by way of example, and any other suitable values can be used in alternative embodiments.

In various embodiments, adapter 76 can be used with waveguides having varying dielectric-constant profiles, or with waveguides having a uniform dielectric constant. Adapter 76 can be made to match, mutatis mutandis, waveguides having any suitable cross-section. The example of FIG. 6 shows an adapter bent at a 90-degree angle, but this choice is made solely for the sake of clarity. A similar adapter can be used with any other suitable angular shape.

Figure 7A:
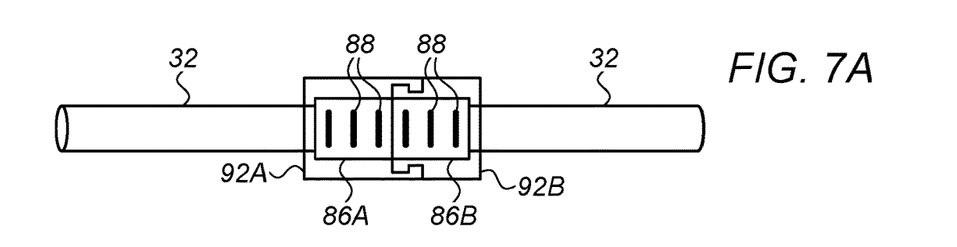
FIGS. 7A and 7B are diagrams illustrating connector assemblies comprising arrays of electrically-conducting elements, in accordance with embodiments that are described herein.

FIG. 7A is a diagram illustrating an in-line connector assembly comprising an array of electrically-conducting elements, in accordance with an embodiment that is described herein. As explained above with reference to FIG. 2, such a connector assembly is used for connecting adjacent sections of mm-wave waveguide 32.

In the present example depicted in FIG. 7A, the connector assembly comprises two connector bodies 86A and 86B, each coupled to a respective section of waveguide 32. Connector bodies 86A and 86B are typically made of a suitable high-K dielectric material.

Each of connector bodies 86A and 86B comprises multiple electrically-conducting elements 88 disposed at periodic intervals along the longitudinal axis of the connector body. As noted above with reference to FIG. 5, electrically-conducting elements 88 may have any suitable shape and geometry. The electrically-conducting elements 88 of each connector body are referred to as a sub-array. When connector bodies 86A and 86B are held longitudinally in proximity to one another, the two sub-arrays jointly form a non-interrupted array that guides the mm-wave signal to propagate from one section of waveguide 32, via the connector assembly, to the other section of waveguide 32.

As explained above, an array of electrically-conducting elements forms periodic constraints on the electrical field component of the mm-wave signal, and therefore leads the mm-wave signal to propagate along the desired axis. By forming a non-interrupted array across the two connectors, the disclosed connector assembly improves the propagation of the mm-wave signal between the connectors, and thus reduces insertion loss.

In some embodiments, the connector assembly further comprises a mechanical attachment mechanism, which is configured to attach connector bodies 86A and 86B to one another (or at least hold connector bodies 86A and 86B in proximity to one another). The attachment mechanism aligns the longitudinal axes of the two connector bodies, and thus forms the array of electrically-conducting elements 88 from the two sub-arrays.

In the example of FIG. 7A, the attachment mechanism comprises a first part 92A connected to connector body 86A, and a second part 92B connected to connector body 86B. Parts 92A and 92B comprise respective clips that fit into one another and firmly attach connector bodies 86A and 86B to one another. In this example, when parts 92A and 92B are attached, connector bodies 86A and 86B make physical contact with one another. In an embodiment, when parts 92A and 92B are attached, uniform periodic spacing between electrically-conducting elements 88 in the array is maintained.

Figure 7B:
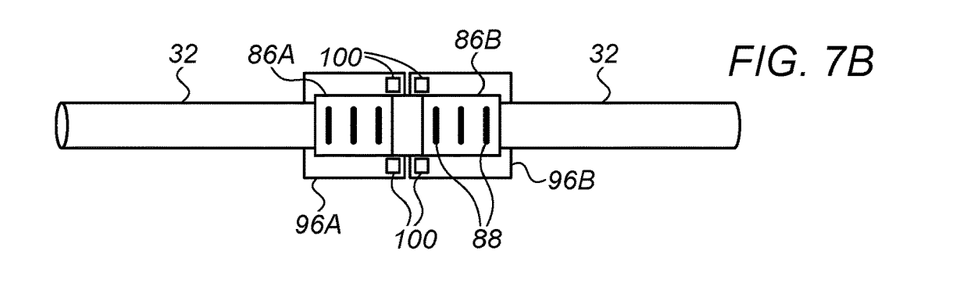

FIG. 7B is a diagram illustrating another in-line connector assembly comprising an array of electrically-conducting elements, in accordance with an alternative embodiment that is described herein. The connector assembly depicted in FIG. 7B is used for connecting adjacent sections of mm-wave waveguide 32. In the example of FIG. 7B, the attachment mechanism comprises a first part 96A connected to connector body 86A, and a second part 96B connected to connector body 86B. Each of connector bodies 86A and 86B comprises multiple electrically-conducting elements 88 disposed at periodic intervals along the longitudinal axis of the connector body. Parts 96A and 96B comprise magnets 100 that face each other and attach connector bodies 86A and 86B to one another.

Unlike the configuration of FIG. 7A above, in the example of FIG. 7B, when parts 96A and 96B are attached, there is no physical contact between connector bodies 86A and 86B. An air gap is seen clearly in the figure, between connector bodies 86A and 86B. Note that the periodicity of the array is kept, regardless of the air gap. In other words, the air gap can be viewed as one or more missing elements in the array, however the remaining elements (on both sides of the gap) still lie approximately on a periodic grid.

The two attachment mechanisms shown in FIGS. 7A and 7B are depicted solely by way of example. Any other suitable attachment mechanism can be used in alternative embodiments.

Figure 8:
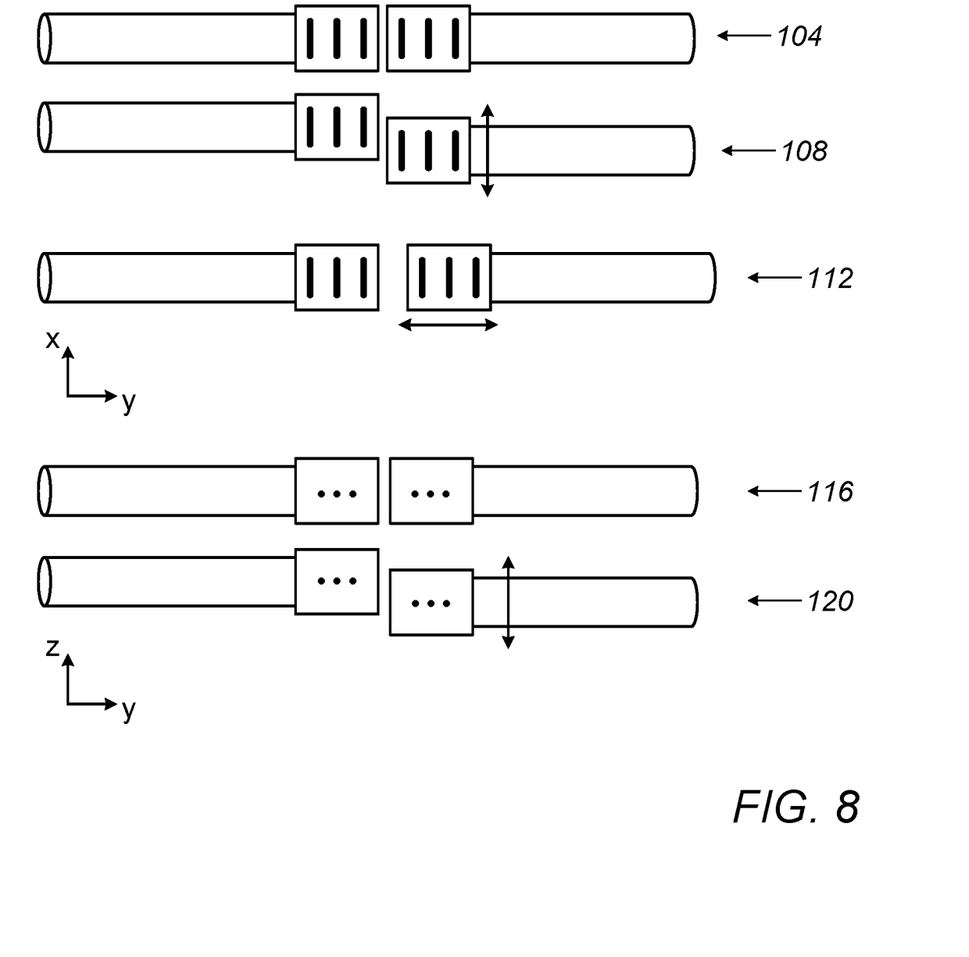
FIGS. 8 and 9 are diagrams illustrating tolerances of in-line connector assemblies to linear and rotational misalignment, in accordance with embodiments that are described herein.

FIG. 8 is a diagram illustrating tolerance of the above-described in-line connector assembly to linear misalignment, in accordance with an embodiment that is described herein.

Starting from the top of the figure, views 104, 108 and 112 are top views of the connector assembly (also referred to as x/y views, with y denoting the longitudinal axis of the connector assembly). Top view 104 shows the connector assembly with no misalignment. Top view 108 shows the connector assembly with some transversal misalignment between the connector bodies. Top view 112 shows the connector assembly with some longitudinal misalignment between the connector bodies.

Views 116 and 120 are side views of the connector assembly (also referred to as z/y views, with y denoting the longitudinal axis of the connector assembly). Side view 116, which corresponds to view 104, shows the connector assembly with no misalignment. Top view 120 shows the connector assembly with some transversal misalignment between the connector bodies, along an axis that is orthogonal to the axis of misalignment seen in view 108.

Figure 9:
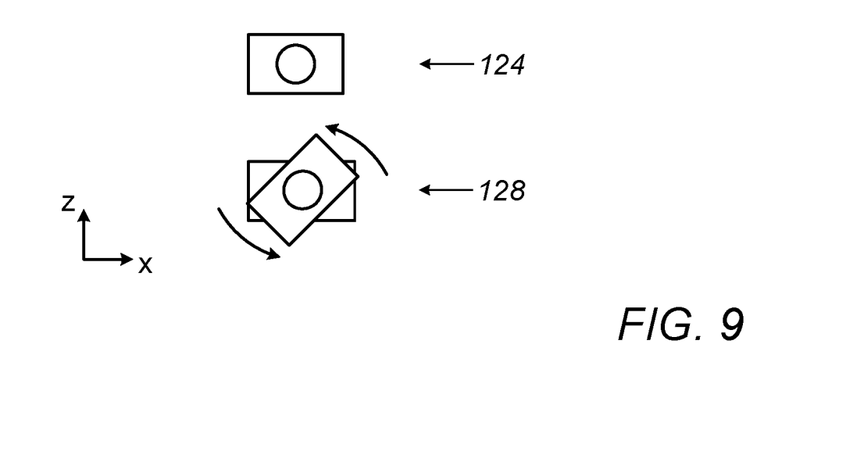

FIG. 9 is a diagram illustrating tolerance of an in-line connector assembly to rotational misalignment, in accordance with an embodiment that is described herein. The figure shows two front views 124 and 128 of the connector assembly (also referred to as z/x views). Front view 124 shows the connector assembly with no rotational misalignment. Top view 128 shows the connector assembly with some rotational misalignment between the connector bodies.

Electromagnetic simulations conducted by the inventors have shown that the disclosed connector assemblies exhibit low loss and good electrical-field confinement even in the presence of such transversal, longitudinal and/or rotational misalignment between the connector bodies. For example, electromagnetic simulations have shown that good performance is still achieved in the presence of (i) an air gap of up to 3 mm between connector bodies, (ii) a 1 mm transversal misalignment, or (iii) a 1 mm longitudinal misalignment between connector bodies. Detailed simulation results are given in U.S. Provisional Patent Application 62/628,822, cited and incorporated by reference above.

In one example embodiment, the connector bodies are made of RO3020® material, produced by Rogers Corp. The width and height of the each connector body are 2 mm and 1 mm, respectively. Each sub-array of electrically-conducting elements in this example is made of copper or gold, and is positioned at the center of the connector body. The length and width of each element in the sub-array are 1 mm and 0.1 mm, respectively. The elements are typically very thin, e.g., 2 microns. The inter-element spacing is approximately 0.5 mm. The above numerical values are given purely by way of example, and any other suitable values can be used in alternative embodiments.

The embodiments described above refer mainly to the use of arrays of electrically-conducting elements in guiding adapters and connector assemblies. Generally, however, such arrays can be used in various other accessories that are inserted in-line between sections of waveguide. In the present context, guiding adapters and connector assemblies, as well as individual connectors, are also referred to as "accessories." Other kinds of accessories that can be fabricated in this manner are, for example, 180° adapters and bent connectors and connector assemblies. In various embodiments, a dielectric body with an array of electrically-conducting elements (e.g., part of a connector, a guiding adapter or other accessory) can be implemented in various ways and using various manufacturing processes.

Figure 10:
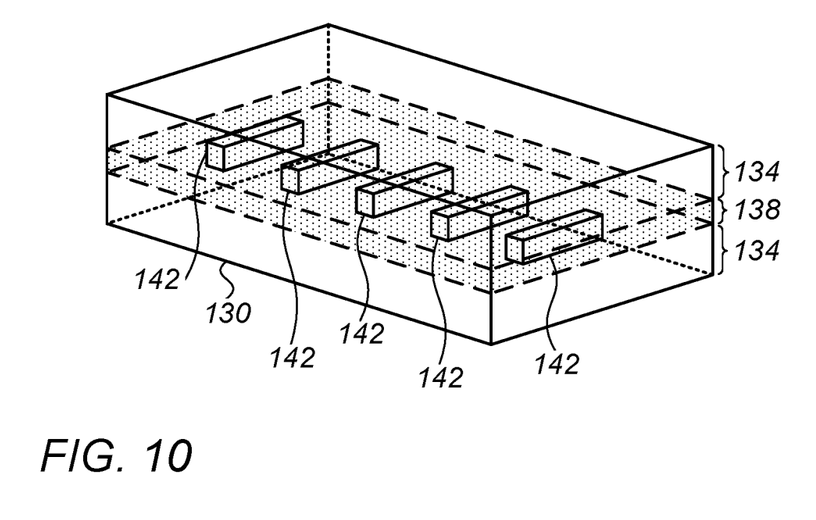
FIG. 10 is a three-dimensional view of an accessory comprising a guiding array, fabricated using a stack of Printed Circuit Board (PCB) layers, in accordance with an embodiment that is described herein.

FIG. 10 is a three-dimensional view of an accessory comprising a guiding array, fabricated using a stack of Printed Circuit Board (PCB) layers, in accordance with an embodiment that is described herein. A structure of this sort can be used for implementing any of the accessories described herein, e.g., guiding adapters and connectors.

In the example embodiment of FIG. 10, a dielectric body 130 and an array of electrically-conducting elements 142 are fabricated in a multi-layer Printed Circuit Board (PCB) fabrication process. In this embodiment, two or more dielectric layers 134 of a multi-layer PCB form the dielectric body. The periodic array of conductive elements 142 is formed in one or more conductive layers 138 that are deposited on one or more of dielectric layers 134 in the multi-layer PCB, for example by direct printing of the conductor material, or in a metallic deposition and etching process, for example.

In various embodiments, various types of suitable mm-wave transmitters and receivers can be used for transmitting and receiving mm-wave signals over the disclosed mm-wave waveguides. Detailed examples of suitable transmitter and receiver configurations are given in U.S. Provisional Patent Application 62/628,822, cited above.

In one embodiment, the transmitter (e.g., transmitter 44 of FIG. 2) uses a "Power Digital-to-Analog Converter (DAC)" architecture. In this architecture, a current-mode DAC is used for modulating the instantaneous output power using M-level Pulse-Amplitude Modulation (PAM). The DAC comprises a bank of current sources connected in parallel, wherein each current source can be selected or un-selected using a respective switch. The switches are controlled by the bits of the data for transmission. Thus, the transmitter Power Amplifier (PA) operated at a constant envelope, and amplitude modulation is achieved by controlling the DAC.

In an embodiment, the receiver (e.g., receiver 48 of FIG. 2) uses Intermediate-Frequency (IF) envelope detection. In this architecture, the receiver chain comprises a mixer that converts the received mm-wave signal to IF. An IF filter then filters-out undesired signals. A Variable Gain Amplifier (VGA) amplifies the filtered IF signal. An envelope detector detects the envelope of the filtered IF signal. The detected envelope is digitized by an Analog-to-Digital Converter (ADC).

U.S. Provisional Patent Application 62/628,822, cited above, also describes a Digital Pre-Distortion (DPD) and equalization scheme that aims to compensate for both static and dynamic non-linearity effects that distort the received mm-wave signal. The disclosed scheme comprises a first training stage that compensates for static non-linearity, followed by a second training stage that compensates for dynamic non-linearity. Following the two training stages, the transmitter pre-distorts the transmitted signal so as to jointly compensate for both types of non-linearity.

In one embodiment, in the first (static) training stage the transmitter transmits a sinusoidal signal (a single tone) whose amplitude ramps-up slowly as a function of time. The receiver receives and demodulates this signal. The digitized and demodulated signal is indicative of the end-to-end transfer function of the entire signal path, including distortion caused by the transmitter and/or receiver. The digitized and demodulated signal is thus fed-back to the receiver using some very slow modulation scheme, and the transmitter uses this feedback to calibrate its pre-distortion function. In the second (dynamic) training stage the transmitter and receiver carry out a similar process, but with a short impulse of or step function of a single tone, instead of a slowly-ramping tone.

The communication system configurations, and the configurations of system elements such as transmitters, receivers, waveguides, adapters and connector assemblies, depicted in the figures and described above, are example configurations that are chosen solely for the sake of conceptual clarity. In alternative embodiments, any other suitable configurations can be used.

Although the embodiments described herein mainly address mm-wave waveguides and accessories for automotive applications, the methods and systems described herein can also be used in other applications, such as in in various industrial networks and other communication equipment.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication in a networking system, the method comprising:

generating a millimeter-wave signal carrying data in a transmitter;

guiding the millimeter-wave signal from the transmitter to a downstream location by a waveguide, which is transmissive at millimeter-wave frequencies and has a dielectric constant that varies over a transversal cross-section of the waveguide in accordance with a predefined profile, including guiding the millimeter-wave along a guiding adapter inserted between sections of the elongated body, the adapter comprising (i) an adapter body, and (ii) a guiding array comprising electrically-conductive elements that are disposed at periodic intervals along the adapter body; and receiving, at the downstream location, the millimeter-wave signal guided by the waveguide in a receiver, and extracting the data carried by the received millimeter-wave signal.

2. A networking system, comprising:

a transmitter, configured to generate a millimeter-wave signal carrying data;

a waveguide that is transmissive at millimeter-wave frequencies, the waveguide configured to receive the millimeter-wave signal from the transmitter, and to guide the millimeter-wave signal from the transmitter to a downstream location by having a dielectric constant that varies over a transversal cross-section of the waveguide in accordance with a predefined profile;

a guiding adapter inserted between sections of the waveguide, the adapter comprising (i) an adapter body, and (ii) a guiding array comprising electrically-conductive elements that are disposed at periodic intervals along the adapter body for guiding the millimeter-wave signal along the adapter body; and a receiver, at the downstream location, configured to receive the millimeter-wave signal guided by the waveguide, and to extract the data carried by the received millimeter-wave signal.

3. The networking system according to claim 2, wherein the predefined profile of the dielectric constant is convex over the transversal cross-section of the waveguide.

4. The networking system according to claim 2, wherein the predefined profile of the dielectric constant is staircase shaped over the transversal cross-section of the waveguide.

5. The networking system according to claim 2, wherein the transversal cross-section of the waveguide is one of hollow and solid.

6. The networking system according to claim 2, wherein the transversal cross-section of the waveguide is one of rectangular, square, circular and elliptical.

7. The networking system according to claim 2, wherein the predefined profile of the dielectric constant is concave over the transversal cross-section of the waveguide.

8. The networking system according to claim 2, wherein the adapter body has a bent angular shape, and wherein the guiding array of electrically-conductive elements is disposed along a longitudinal axis of the adapter body that follows the bent angular shape of the adapter body, the guiding array thereby being configured to guide the millimeter-wave signal to follow the bent angular shape of the adapter body.

9. A networking system, comprising:

a transmitter, configured to generate a millimeter-wave signal carrying data;

a waveguide that is transmissive at millimeter-wave frequencies, the waveguide configured to receive the millimeter-wave signal from the transmitter, and to guide the millimeter-wave signal from the transmitter to a downstream location by having a dielectric constant that varies over a transversal cross-section of the waveguide in accordance with a predefined profile;

an in-line connector assembly disposed between a first section and a second section of the waveguide, the in-line connector assembly comprising:

a first connector body coupled to the first section, the first connector body having a first longitudinal axis and comprising a first sub-array of electrically-conductive elements disposed at periodic intervals along the first longitudinal axis;

a second connector body coupled to the second section, the second connector body having a second longitudinal axis and comprising a second sub-array of electrically-conductive elements disposed at periodic intervals along the second longitudinal axis; and a mechanical attachment mechanism, configured to hold the first connector body and the second connector body in proximity to one another; and a receiver, at the downstream location, configured to receive the millimeter-wave signal guided by the waveguide, and to extract the data carried by the received millimeter-wave signal.

10. The networking system according to claim 9, wherein the mechanical attachment mechanism is configured to align the first longitudinal axis and the second longitudinal axis, to thereby jointly form from the first sub-array and the second sub-array a non-interrupted array of the electrically-conductive elements that guides the millimeter-wave signal to propagate from the first section through the second section of the waveguide.

11. The networking system according to claim 9, wherein, when held in proximity to one another by the mechanical attachment mechanism, the first connector body and the second connector body form a non-interrupted array of the electrically-conductive elements irrespective of whether physical contact is made between the first connector body and the second connector body.

12. The networking system according to claim 9, wherein the mechanical attachment mechanism comprises one or more clips configured to hold the first connector body and the second connector body in fixed orientation or in physical contact with each other.

13. The networking system according to claim 9, wherein the mechanical attachment mechanism comprises one or more magnets configured to hold the first connector body and the second connector body in a fixed orientation or in physical contact with each other.

14. A waveguide, comprising:

an elongated body that is transmissive at millimeter-wave frequencies, the waveguide configured to receive a millimeter-wave signal, and to guide the millimeter-wave signal by having a dielectric constant that varies over a transversal cross-section of the elongated body in accordance with a predefined dielectric profile; and a guiding adapter inserted between sections of the elongated body, the adapter comprising (i) an adapter body, and (ii) a guiding array comprising electrically-conductive elements that are disposed at periodic intervals along the adapter body for guiding the millimeter-wave signal along the adapter body.

15. The waveguide according to claim 14, wherein the predefined profile of the dielectric constant is staircase shaped over the transversal cross-section of the waveguide.

16. The waveguide according to claim 14, wherein the transversal cross-section of the waveguide is one of hollow and solid.

17. The waveguide according to claim 14, wherein the transversal cross-section of the waveguide is one of rectangular, square, circular and elliptical.

18. The waveguide according to claim 14, wherein the predefined profile of the dielectric constant is concave over the transversal cross-section of the waveguide.

19. The waveguide according to claim 14, wherein the predefined profile of the dielectric constant is convex over the transversal cross-section of the waveguide.

* * * * *